United States Patent [19]
Johnson et al.

[11] Patent Number: 5,973,050
[45] Date of Patent: Oct. 26, 1999

[54] COMPOSITE THERMOELECTRIC MATERIAL

[75] Inventors: George H Johnson; Robert A Martin, both of Wilmington, Del.

[73] Assignee: Integrated Cryoelectronic Inc., Yorklyn, Del.

[21] Appl. No.: 08/864,062

[22] Filed: May 27, 1997

Related U.S. Application Data

[60] Provisional application No. 60/022,501, Jul. 1, 1996.
[51] Int. Cl.⁶ ........................................... C08K 3/00
[52] U.S. Cl. .......................... 524/439; 524/440; 524/441
[58] Field of Search .................................... 524/439, 440, 524/441

[56] References Cited

U.S. PATENT DOCUMENTS 5,334,292  8/1994  Rajeshwar et al. ................... 204/59 R
5,472,519  12/1995  Howell et al. ....................... 136/236.1

OTHER PUBLICATIONS

Rieke et al (1995).

Wallace et al., "Conductive Electroactive Polymers", 1997, Lancaster/Basel, pp. 67–72, Technomic Publishing.

*Primary Examiner*—Edward J. Cain
*Attorney, Agent, or Firm*—Edward J. Kaliski

[57] ABSTRACT

A composition of matter is disclosed in which nanophase metal particles are effectively dispersed in a polymer matrix so that hitherto unattainable thermoelectric properties are attained. Preferred polymers and metals are taught. A method of making the composition of matter useful as a themoelectric composite material using a conducting polymer matrix is disclosed as is a thermoelectric cooling/heating device which uses that composition.

37 Claims, 9 Drawing Sheets

COMPOSITE THERMOELECTRIC MATERIAL

This application claims the benefit of U.S. Provisional No. 60/022,501, Jul. 1, 1996.

FIELD OF THE INVENTION

This invention relates to the field of thermoelectric heating and cooling and more particularly to composite thermoelectric materials useful therein.

BACKGROUND OF THE INVENTION

Thermoelectric cooling has been found useful in such diverse applications as CCD cameras, infrared imaging systems and other electro-optic devices, microwave electronic devices, medical instruments, precision temperature controls, laser diodes, and cryoelectronic computer processors. This technology serves well because a unitary component provides cooling for the entire device in a compact form without moving parts and associated mechanical vibrations. At present, the method is cooling capacity limited because the materials in use, primarily semiconducting ceramics such as bismuth telluride are not efficient enough. This limitation confines the practical end-uses to physically smaller devices. Given a thermoelectric material with a higher cooling capacity and efficiency than any currently available, many practical advantages could be achieved. Larger cooling systems could be built replacing those using vapor compression cycles. This would reduce the use of chlorofluorocarbons and their substitutes, reduce the weight and expense of the coolers, and would save energy, all considerations in marine, transportation, consumer, military and industrial applications.

The thermoelectric figure-of-merit, ZT, measures the ability of a material to function in a thermoelectric device. The figure-of-merit is expressed by the well known equation:

$$ZT = S^2 \sigma T / \kappa$$

where;

S=Seebeck coefficient ($\mu$V/K)

$\sigma$=electrical conductivity ((S/cm; ($\Omega$-cm)$^{-1}$))

$\kappa$=thermal conductivity (W/cm K)

T=temperature (K)

Despite three decades of effort, only small increases in the figure-of-merit for semiconducting ceramic materials have been attained (Mahan G. et al.; Physics Today, 3/97; p 42). The ZT for the best inorganic semiconductors such as $Bi_2Te_3$ is about 1. In commercial practice, the value ranges between 0.7 and 0.9. The best organic conductors such as polythiophene have ZT very much less than 1 even though these materials may have Seebeck coefficients greater than one thousand. Their problem is low electrical conductivity. For example, the electrical conductivity of undoped polythiophene is $10^{-11}$ ($\Omega$-cm)$^{-1}$.

It is clear that large values of Seebeck coefficient and of electrical conductivity are desired. Unfortunately, in known materials, increases in Seebeck coefficient are associated with reduction in conductivity and vice versa.

Howell investigated a number of conjugated, conducting polymers (see Technical Report, Howell B., "Thermoelectric Properties of Conducting Polymers", CARDIVNSWC-SSM-64-94/Jul. 12, 1994) because these have small values for thermal conductivity, low density, moderate electrical conductivity and some have moderately large Seebeck coefficients. The term "conjugated" above refers to polymers whose backbone consists of (1) single bonds alternating with (2) unsaturated groups such as double bonds, triple bonds, or aromatic groups. Tests of a number of conducting, conjugated, polymers including polyacetylene, polyacenes, polyaniline, polyparaphenylene and polyparaphenylenevinylene, polyphenylene sulfide, polypyrrole, polythiophene, and Schiff's Bases were carried out along with various additions (carbon, iodine, tetraethylamineammonium tetrafluoroborate, potassium persulfate and ferric chloride). These materials did not yield the desired improvement in thermoelectric figure-of-merit. In U.S. Pat. No. 5,472,519, Howell et al. disclose using poly-3-octylthiophene and ferric chloride in a respective molar ratio of approximately 2:1 as a thermoelectric material. The figure-of-merit so obtained, 0.007, shows a modest increase over the prior art for doped conducting polymers but other known semiconductor materials, e.g. $Bi_2Te_3$, approach 1.0.

It is an object of the instant invention to provide a composition of matter having a significantly higher ZT than that of presently known materials and to establish methods of making and using this composition of matter.

It is a further object to provide thermoelectric devices, based on the novel composition of matter, that will have hitherto unachievable efficiency.

BRIEF DESCRIPTION OF THE INVENTION

The problems of the prior art have been overcome by a new composition of matter comprising a dispersion of nano phase metal particles in a conducting polymer matrix. This composition of matter is useful as a thermoelectric cooling and/or heating medium comprising:

i) a conductive polymer characterized by a high inherent Seebeck coefficient and a low inherent thermal conductivity; and ii) an effective amount of nanometer-sized metal particles dispersed into and intimately associated with said polymer to establish a nanophase metal/polymer composite material;

whereby the electrical conductivity of the nanophase metal/polymer composite material is substantially increased without significant change in either said thermal conductivity or Seebeck coefficient.

Nanophase metal particles are added to, and intimately mixed with, conducting polymers which usually have high Seebeck coefficients. Effective nanophase metals comprise silver, copper, gold, platinum, palladium, chromium, iron, antimony, tantalum, tin and similar metals or mixtures thereof. They are in the form of powders with particle sizes of 5 nanometers to 100 nanometers and sintered aggregations of these powders, or mixtures thereof. These aggregations are varying-length "strings" of the nano-particles in which the nanophase particles of metal are fused tightly and connected by narrowed sections of the same metal. The particle size should be compared to conventional micropowders which have sizes ranging from 100 nanometers to 100 micrometers. When added to conducting polymers, these nanophase particles substantially increase the electrical conductivity at volume concentrations significantly lower than corresponding volume concentrations needed for the large electrical conductivity increase observed when metal nanoparticles are dispersed in normal non-conducting polymers. These concentrations are low enough that the thermal conductivity and Seebeck coefficient are little affected while the electrical conductivity is improved by several orders of magnitude. The conducting polymer is selected from the group consisting of polythiophene, polyaniline, polypyrrole, polyacetylene, their substituted derivatives and similar compounds.

We have found that nano-particle metal/conducting polymer compsitions produce a ZT significantly greater than one at room temperature compared with a ZT of about one for presently known inorganic semiconductors.

In an embodiment of the instant invention, nanophase silver particles were incorporated into a special polymer of poly(3-octylthiophene), regio-regular poly(3-octylthiophene-2,5-diyl) (henceforth "RPOT"). The resulting composites, at metal concentrations of about 4 volume percent, showed a Seebeck coefficient on a glass substrate of at least 800 $\mu$V/K and resulting ZT of at least 4 at room temperature. This ZT value exceeds those of the best prior art semiconductor material by a one-order-magnitude factor of 4 to 5. Further, without the presence of a thermally-shunting substrate, a Seebeck coefficient as high as 9,950 $\mu$V/K was measured producing a ZT value in excess of 700, a surprising value not previously contemplated, two orders of magnitude greater than the prior art.

DESCRIPTION OF THE INVENTION

It has been recognized for years (Mahan, supra and Howell, supra) that electroactive, conducting polymers exhibit Seebeck coefficients that are much larger than those exhibited by the well known standard thermoelectric semiconductors. These polymers have very low thermal conductivity and would have a high thermoelectric figure-of-merit if only the intrinsically low electrical conductivity were much higher. The situation is reversed for traditional semiconductor materials: high intrinsic electrical conductivity is more than offset by high thermal conductivities and lower Seebeck coefficients. Because of their lower electrical conductivity, ZT for conducting polymers, as seen from the defining formula, is actually much lower than for the semiconductors used in today's thermoelectric coolers. The best of the prior art materials, $Bi_2Te_3$, has a maximum ZT of 0.9 at room temperature (T=300 K).

Egli, Ed., Thermoelectricity, pp. 121, 132–135, Wiley, 1960 graphically show the usual highly coupled relationship between the Seebeck coefficient and electron density in insulators, semiconductors, and metals in which the Seebeck coefficient decreases dramatically and the electrical conductivity increases dramatically as the electron density increases. This results in the previously known optimum for thermoelectric materials to occur in the semiconductor range of materials, and explains why semiconductor materials presently are used in the thermoelectric coolers of the prior art.

Considerable research work has been done (see Howell, paper and patent supra) aimed at increasing the electrical conductivity of conductive polymers without significantly decreasing the Seebeck coefficient or increasing the thermal conductivity. This work was based on doping and did not have the desired effect of producing a material with a ZT equal to or greater than 1.0.

Figure 1:
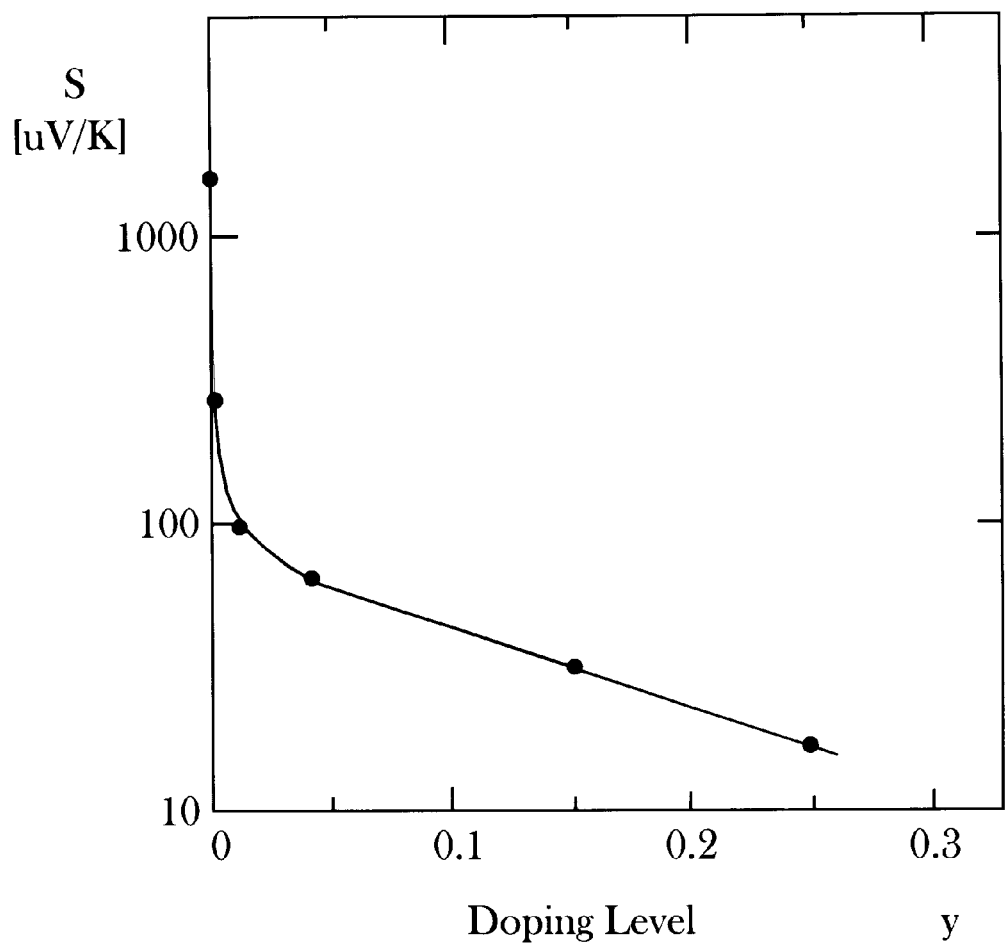
FIG. 1 is a plot of thermoelectric Seebeck coefficient of $BF_4$ anion-doped electroactive polymer polythiophene as a function of doping level (prior art).
Figure 2:
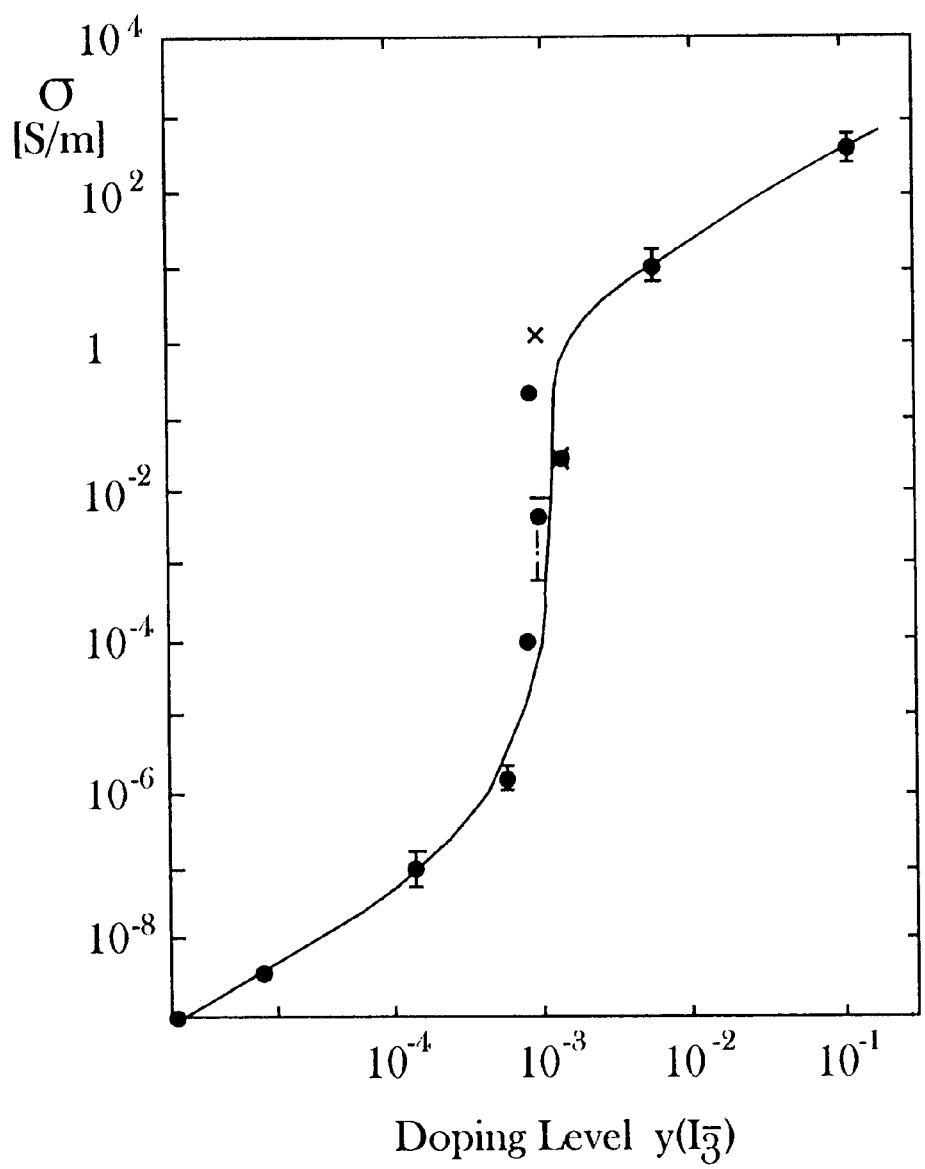
FIG. 2 is a plot of DC conductivity of iodine-doped electroactive polymer polythiophene as a function of doping level (prior art).

In many cases, doping decreases S (Seebeck coefficient) much faster than it increases $\sigma$ (electrical conductivity) so the thermoelectric figure-of-merit (ZT) decreases even more rapidly. The hoped for increase in ZT becomes instead a two or more orders-of-magnitude decrease. FIG. 1 (Hayashi, H. et al., J. Phys. Soc. Jpn., 55, p 1971, 1986) shows the decrease in S for a typical conductive polymer, polythiophene, as a function of dopant level. As the dopant level is increased, FIG. 2 (derived from Kaneto, K. et al., J. Phys. Soc. Jpn., 54, p 1146, 1985) shows the resulting increase in the electrical conductivity.

Adding micro-powders of metal and semiconductor materials to normal, non-conducting polymers increases the overall electrical conductivity of the composite material (Gunther, B., MPR, Elsevier Publ., February, pp. 18 to 20, 1995) by providing a shunting connector path for the electrons through the polymer matrix but does not increase the electrical conductivity of the non-conducting polymer itself. When used in high enough concentrations to greatly increase the electrical conductivity, these micro-powders in normal non-conducting polymers also greatly increase the thermal conductivity. Hence, there is a net loss in the ZT of the composite material structure.

Figure 3:
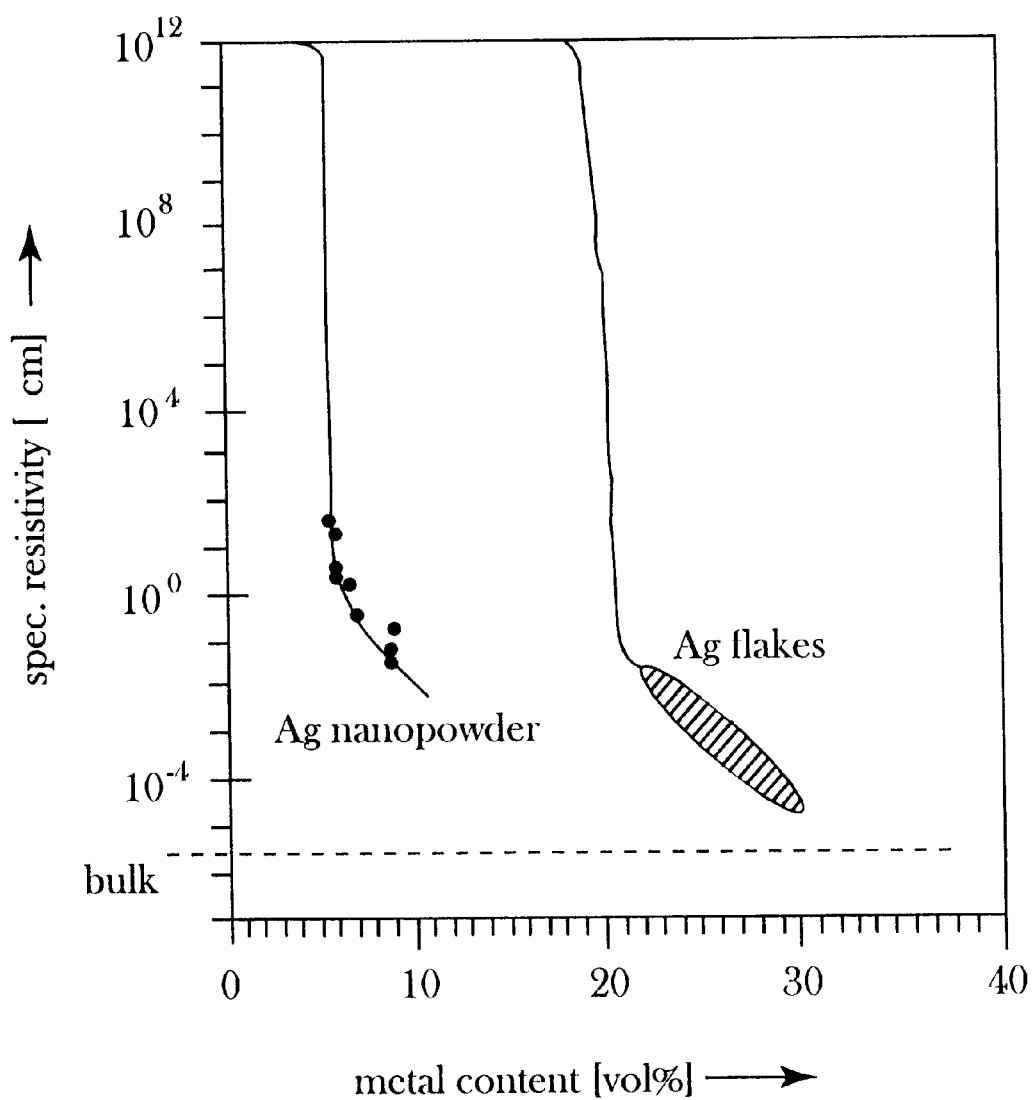
FIG. 3 is a plot of specific resistivity (DC) of silver nano-powders and silver flakes in epoxy matrix as a function of metal volume content (prior art).

When added to normally insulating polymers, nanophase metal particles substantially increase the electrical conductivity at volume % concentrations about one-fourth (<5 vol. %) of conventional micro-sized metal powders (<20 vol. %), as is illustrated in FIG. 3 (Gunther, supra). These electrical-conductivity-enhancing volume concentrations provide a shunting conducting path but are low enough that the thermal conductivity is not affected while the electrical conductivity is improved by several orders-of-magnitude.

Using the literature on conducting polymers (Rieke, R. D. et al., J. Am. Chem. Soc., 117, pp. 233 to 244, 1995;

Using the literature on conducting polymers (Rieke, R. D. et al., J. Am. Chem. Soc., 117, pp. 233 to 244, 1995; Roncali, J., Chem. Rev., 92, pp. 711 to 738, 1992; Sandman, D. J., TRIP, 2, no. 2, pp. 44 to 54, 1994; and Aldissi, M., Inherently Conducting Polymers, Noyes Data Corporation) we thoroughly reviewed commercially available conducting polymers exhibiting: intrinsic conductivity without doping; a high Seebeck coefficient; low inherent thermal conductivity; atmospheric stability; and high solubility in well-characterized solvents. Conducting polymer families evaluated included polythiophene, polypyrrole, polyaniline, and their derivatives. Based on this evaluation, we selected the poly (3-alkylthiophenes) as the polymer sub-family of choice for use in an example of the invention (Rieke, R. D. et al. supra).

Samples of a regioregular poly(3-octylthiophene-2,5-diyl) (RPOT), synthesized by and available from Rieke Metals, Inc. of Lincoln NE, were obtained. Regioregular refers to a polymer structure with individual monomer units attached to each other "head-to-tail" rather than attached randomly.

Rieke provided a recently available and superior candidate in this polymer sub-family: regioregular poly (3-octylthiophene-2,5-diyl) [RPOT] (Rieke, R. D. et al., supra) which is greater than 98% regioregular. This structure contributes to its three times higher intrinsic conductivity ($10^{-5}$ to $10^{-6}$ $(\Omega\text{-cm})^{-1}$) than the conductivity ($10^{-8}$ to $10^{-9}$ $(\Omega\text{-cm})^{-1}$) for random poly(3-octylthiophene-2,5-diyl) available from other vendors. Corrpared to the lower conductivity random polymer, we predicted the regioregular version of the polymer RPOT to be inherently advantageous toward achieving the increased thermoelectric figure-of-merit, ZT.

Unlike most conducting polymers, which are usually intractable, RPOT and other alkyl substituted polythiophenes are soluble in common, well-characterized, solvents such as chloroform, methylene chloride, carbon tetrachloride, toluene and the xylenes. These volatile solvents not only provide the solubility needed for forming uniform dispersions of the nanophase metal particles in the polymer matrix, but they assure that the solvent can be removed from the nano-metal/polymer composite films that are formed. We used chloroform for the initial experiments.

After studying the properties of the readily available nanophase metals, silver nano-particles were chosen for their excellent conductivity and low reactivity. The Fraunhofer Institut Angewandte Materialforschung of Bremen, Germany provided nanophase silver particles made by their inert-gas-condensation (IGC) process (Gunther, B., supra); Pelster, R. et al., Phys. Rev B, 45, no 16, pp. 8929–8932, 1992). This material is composed of aggregated silver nanoparticles with a mean aggregate size of approximately 8 $\mu$m made up of nano particles with a mean diameter of approximately 20 nm. The specific surface area of the sample of IGC silver nano-particles is 4 $m^2/gm$ as measured by the BET (Brunauer-Emmet-Teller) technique.

Having procured candidate component materials, the second step in carrying out examples of the invention was to fabricate the conducting polymer/nanophase metal particle composites to be used for thermoelectric property measurements. The samples made were thick, about 100 $\mu$m to 300 $\mu$m films of silver nanophase particles dispersed in RPOT. The nanophase silver particles were completely wetted and dispersed in chloroform using a moderate shear mechanical blade mixer to which the RPOT polymer was added and dissolved. The nano-silver/polymer/solvent blend was mixed until a fairly viscous fluid was formed as the chloroform evaporated. The viscous fluid was spread onto large glass slides. Thick films of the composite material formed as the remaining chloroform solvent evaporated.

Two large glass slides were prepared for each concentration of IGC (Eifert, H. and Gunther, B., Proc. of PM '94 World Congress, 1994) nanophase silver particles used: 0.0 vol. %, 5.0 vol. % and 10.0 vol. % (Volume percents are used for concentration vs. weight percents to allow meaningful comparisons between composites when their component materials vary in density). TEM micrographs showed nanophase IGC nano-silver very uniformly dispersed in RPOT polymer for 5.0 vol. % concentration. The electrical conductivity of the thick film samples was measured by the standard four point probe method as $\sigma=10^{-5}$ to $10^{-6}$ $(\Omega\text{-cm})^{-1}$ for 0 vol. % and 5 vol. % films and $\sigma=10^{+1}$ to $10^{+2}$ $(\Omega\text{-cm})^{-1}$ for 10 vol. % thick films.

The bulk samples (2 to 4 mm thick, about 4 cm long) of nano-silver/RPOT composites used to measure the thermoelectric properties were made by first removing samples of the thick films from the large glass slides. Carefully weighed portions of the thick films were then layered into stacks and melted/mixed/annealed (at 190° C. to 200° C.) into the homogeneous test samples. During this elevated temperature process, V-shaped, thirty gauge (0.012 in. diameter) copper wire electrodes were inserted one cm apart into each of the test samples while they were in a non-solid state. Using this methodology, bulk experimental samples were made at concentrations of 0, 1, 2, 3, 4, 5 and 10 vol. %. The bulk samples at 1, 2, 3 and 4 vol. % were made by mixing appropriate proportions of melted 0.0 vol. % and 5.0 vol. % thick films.

Next came the measurement of the thermoelectric properties of the nano-silver/conducting polymer composites. The fundamental thermoelectric properties (Ure, R. in Encyclopedia of Physics, Besancon, R., Editor, pp. 944–966, 1974) measured were:

S, Seebeck coefficient ($\mu$V/K), by establishing a temperature difference ($\Delta$T) between the two ends of the sample and measuring the voltage difference ($\Delta$V) thereby generated: S=$\Delta$V/$\Delta$T. Alternatively a fixed current (I) was sent through the sample, thereby generating a temperature difference ($\Delta$T).

$\sigma$, electrical conductivity (106 -cm)$^{-1}$, by measuring resistance (R) between two ends of the sample and measuring the length (L) and cross-sectional area (A) of the sample $\sigma$=(1/R) (L/A).

$\kappa$, thermal conductivity (W/cm K), by measuring the thermal power (P) flow between two ends of the sample where a temperature difference ($\Delta$T) is maintained and measuring the length (L) and cross-sectional area (A) of the sample: $\kappa$=(P/$\Delta$T) (L/A).

ZT, the thermoelectric figure-of-merit, governing the maximum efficiency of thermoelectric coolers and heaters, is derived from the above parameters: ZT=$S^2\sigma T/\kappa$.

The thermal conductivity for RPOT and nano-silver/RPOT is constant and in line with the low $\kappa$ measured for other polymers (Encyclopedia of Polymer Science & Engineering, Wiley Interscience, pp 711 to 747, 1989) $\kappa$=1.0×10$^{-3}$ W/cm K.

Seebeck coefficients and electrical conductivities were measured for the bulk samples with nano-silver vol. % of 0, 1, 2, 3, 4, 5 and 10. Measurements were made in some bulk samples (0, 5, 10 vol. %) on quartz substrates with $\Delta$T=100 K (ice and boiling water) and other bulk samples (1, 2, 3, 4 vol. %) on glass substrates with $\Delta$T=120 K (room temperature and heated metal probe). $\Delta$V was measured with a standard precision voltmeter. Tables I to III and FIGS. 4 to 7 present the several experimental results obtained.

Figure 4:
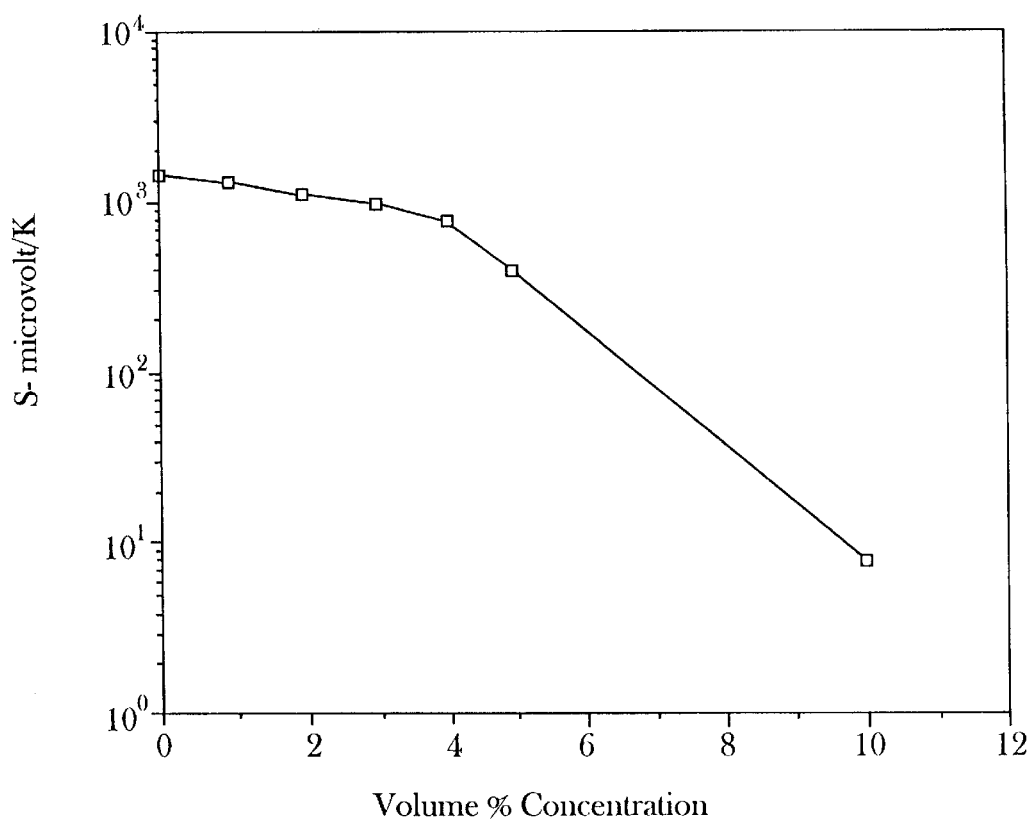
FIG. 4 is a plot of Seebeck coefficient (S) versus volume % metal concentration for nano-Ag/RPOT composite materials on glass substrate.
Figure 5:
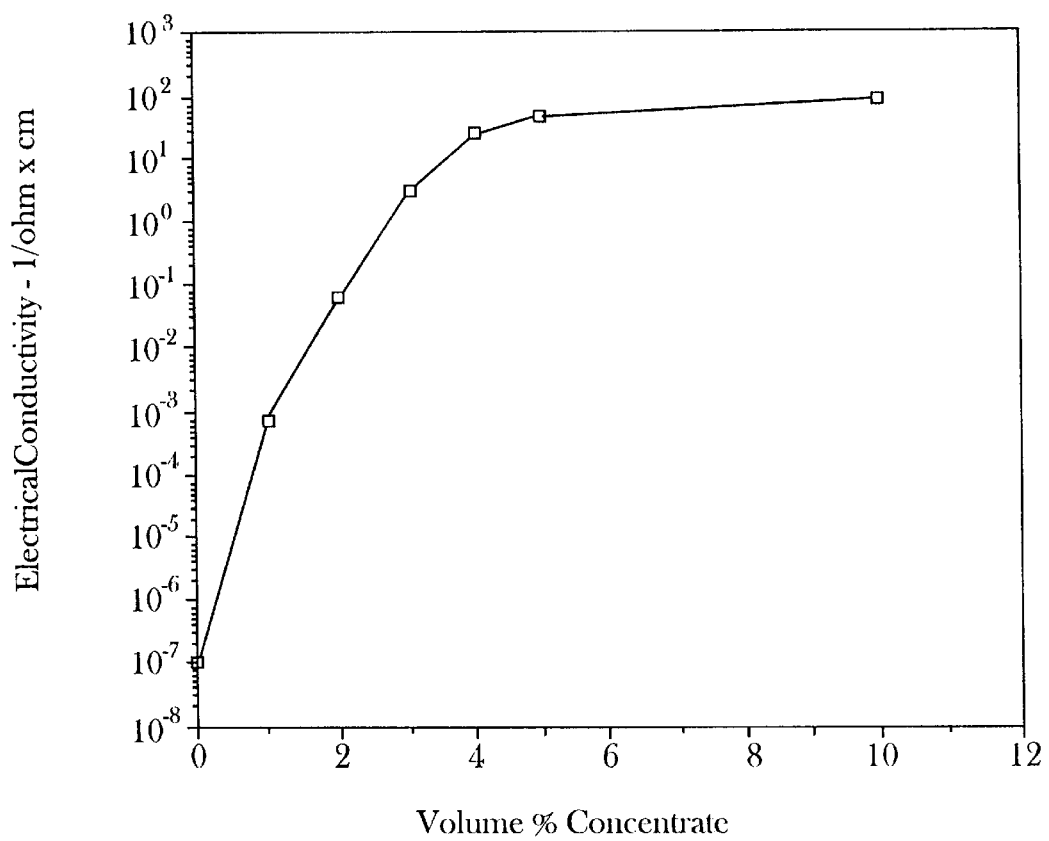
FIG. 5 is a plot of electrical conductivity ($\sigma$) versus volume % metal concentration for nano-Ag/RPOT composite materials of the invention measured on glass substrate.
Figure 6:
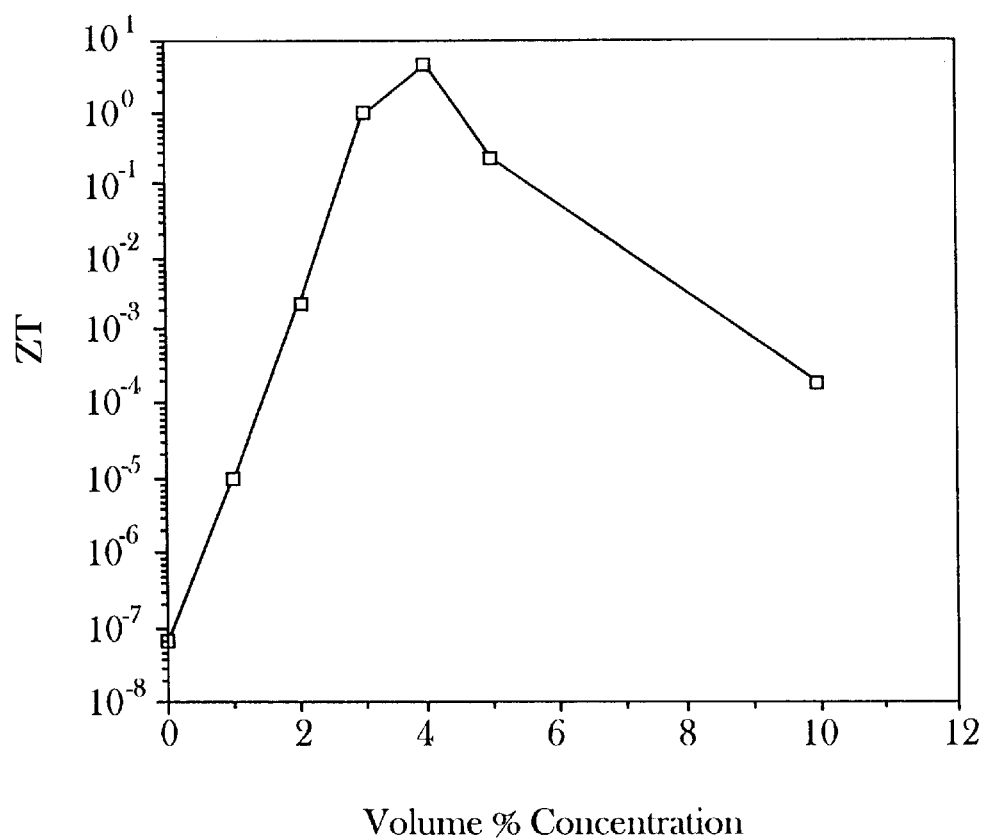
FIG. 6 is a plot of thermoelectric figure-of-merit (ZT) vs. volume % metal concentration for nano-Ag/RPOT composite materials of the invention measured on glass substrate.

The experimental results will now be discussed. Table I presents the above data as well as the calculated ZT values. FIGS. 4 and 5 present plots of S and $\sigma$ vs. nano-Ag concentration. S decreases slowly from 0 vol. and drops sharply at 5 vol. while $\sigma$ increases dramatically and levels off at 5 vol. %. FIG. 6 presents a plot of ZT vs. nano-Ag concentration. Projections correspond to a ZTmax=10.6 somewhere within the very sensitive 3 to 4 vol. % concentration range where ZT=0.9 and 4.8 respectively.

TABLE I

Thermoelectric Measurement Data: Volume % Concentration, Seebeck Coefficient (S), Electrical Conductivity ($\sigma$) and Figure-of-Merit (Z and ZT) on Glass Substrates

| Vol. n-Ag | $\sigma(\Omega - cm)^{-1}$ | S($\mu$v/K) | Z(/K) | ZT(at 300 K) |
|---|---|---|---|---|
| 0 | $1.0 \times 10^{-7}$ | 1,400 | $2.0 \times 10^{-10}$ | $6.0 \times 10^{-8}$ |
| 1 | $8.0 \times 10^{-4}$ | 1,300 | $3.1 \times 10^{-8}$ | $9.3 \times 10^{-6}$ |
| 2 | $6.0 \times 10^{-2}$ | 1,100 | $7.2 \times 10^{-5}$ | $2.2 \times 10^{-3}$ |
| 3 | $3.0 \times 10^{+2}$ | 1,000 | $3.0 \times 10^{-3}$ | $9.0 \times 10^{-1}$ |
| 4 | $2.5 \times 10^{+1}$ | 800 | $1.6 \times 10^{-2}$ | $4.8 \times 10^{+0}$ |
| 5 | $5.0 \times 10^{+1}$ | 400 | $8.0 \times 10^{-3}$ | $2.4 \times 10^{-1}$ |
| 10 | $1.0 \times 10^{+2}$ | 8 | $6.4 \times 10^{-6}$ | $1.9 \times 10^{-4}$ |

TABLE II

Temperature Differences Generated by Constant Current in Four & Five Volume % Nano-Ag/RPOT Composite Materials

| Thermoelectric Material | Example Number | Temperature Hot Junction $T_H$ in K | Temperature Cold Junction $T_C$ in K | Temperature Difference ($\Delta T = T_H - T_C$) $\Delta T$ in K |
|---|---|---|---|---|
| First sample of nano-Ag/RPOT 4 vol. on glass substrate I = 180 mA and V = 2200 mV | #1 | 323 | 310 | 13 |
| | #2 | 326 | 313 | 13 |
| | #3 | 329 | 318 | 11 |
| Second sample of nano-Ag/RPOT 4 vol. on glass substrate I = 180 mA and V = 2200 mV | #1 | 330 | 315 | 15 |
| | #2 | 328 | 316 | 12 |
| | #3 | 340 | 319 | 21 |
| First sample of nano-Ag/RPOT 5 vol. on glass substrate I = 100 mA I = 500 mA I = 1800 mA | #1 | 300 | 299 | 1 |
| | #2 | 302 | 300 | 2 |
| | #3 | 319 | 318 | 1 |

TABLE III

Seebeck Coefficient (S) and Inferred Figure-of-Merit (Z and ZT) of Nano-Ag/RPOT "Free-Standing" vs. on Substrate Samples

| Volume % Concentration | Sample Substrate | Seebeck Coefficient S($\mu$V/K) | Figures-of-Merit Z(1/K) | ZT @ 300 K |
|---|---|---|---|---|
| 0 | Quartz | 1,400 | $2.0 \times 10^{-10}$ | $6.0 \times 10^{-8}$ |
| 0 | Free Standing | 27,400 | $7.7 \times 10^{-8}$ | $2.3 \times 10^{-5}$ |
| 4 | Glass | 800 | $1.6 \times 10^{-2}$ | $4.8 \times 10^{+0}$ |
| 4 | Free Standing | 9,950 | $2.5 \times 10^{+0}$ | $7.4 \times 10^{+2}$ |

ZT has been enhanced significantly as $\sigma$ increases greatly and S declines moderately and the thermal conductivity has not changed.

To make sure that the nano-Ag/RPOT composites were actually behaving as thermoelectric materials, a circuit was used that delivered a fixed current through two different 4 vol. samples to see if they generated a temperature difference ($\Delta T$). The experimental results are given in Table II. It is clear substantial temperature differences were readily generated in 4 vol. % composites. Only minor teperature differences were observed in a 5 vol. % sample.

All of the preceding graphs, figures and tables prove that the nano-Ag/conducting polymer composites comprise a new class of thermoelectric materials giving high ZT.

Figure 8:
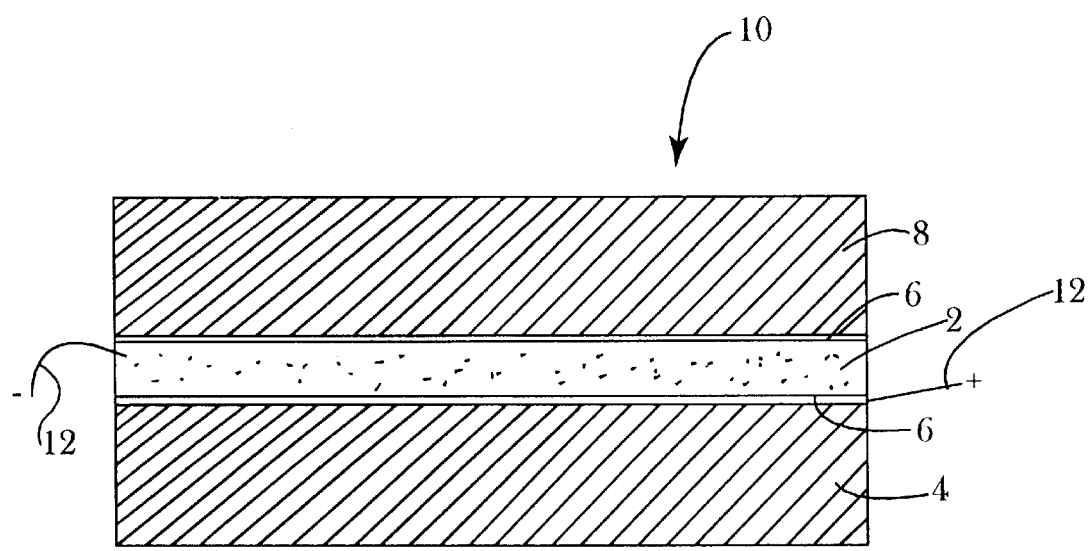
FIG. 8. is a schematic cross-sectional drawing of a single stage thermoelectric cooling device using the composition of matter of the invention.

Literature values for the Seebeck coefficient (S) of random polythiophene (Hayashi et al., supra) and poly(3-octylthiophene) (Howell, B., supra) range between 1,700 $\mu$V/K and 1,800 $\mu$V/K. This is close to the measured value for RPOT: 1,400 $\mu$V/K (see Table I). The regioregular composites' Seebeck coefficients as a function of vol. % concentrations of nanophase silver were measured while the samples were on substrates of quartz or glass. These substrates have thermal conductivities $\kappa$=6.0×10$^{-2}$ and 2.0×10$^{-2}$ W/cm K, respectively, compared to 1.0×10$^{-3}$ W/cm K for RPOT indicating that "thermal shunting" is a factor in the measurement of the Seebeck coefficient while RPOT is on a substrate. Moreover, the substrates were quite thick compared to the test composites. It follows then that the values observed for the free standing test samples are attainable in a thermoelectric device constructed as shown in FIG. 8.

Figure 7:
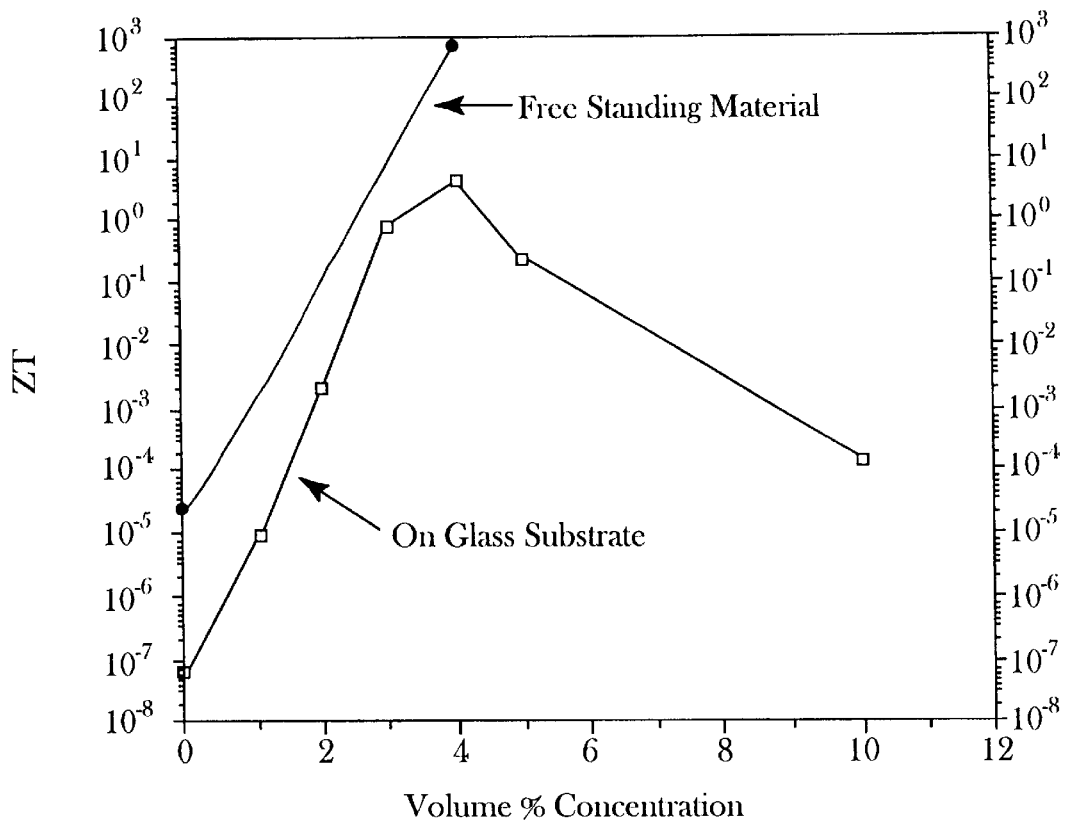
FIG. 7 is a plot of figure-of-merit (ZT) versus volume % metal concentration for nano-Ag/RPOT composite materials of the invention measured on glass substrate and as a free-standing sample.

Recently, researchers (Monkman, A. P. et al., in Electronic Properties of Polymers, Roth S. et al, Editors, Springer-Verlag, pp. 255 to 261, 1992 and Holland E. and Monkman, A., Synthetic Metals, 74, pp. 75 to 79, 1995) reported large differences in Seebeck coefficients for a conducting polymer measured as "free-standing" samples compared to values measured when the samples were on "thermal shunting" substrates such as glass and quartz. To explore this effect, the Seebeck coefficient of pure RPOT and a sample with 4 vol. % concentration of nano-silver were measured as "free standing" samples with $\Delta T$=20.11 K. The experimental results are given in Table III, showing a 12× to 20× increase in the measured Seebeck coefficient occurs which has a large effect on inferred ZT (FIG. 7). The measured Seebeck voltage decreased precipitously when "free-standing samples" were touched to a glass or copper substrate during the measurement.

Figure 9:
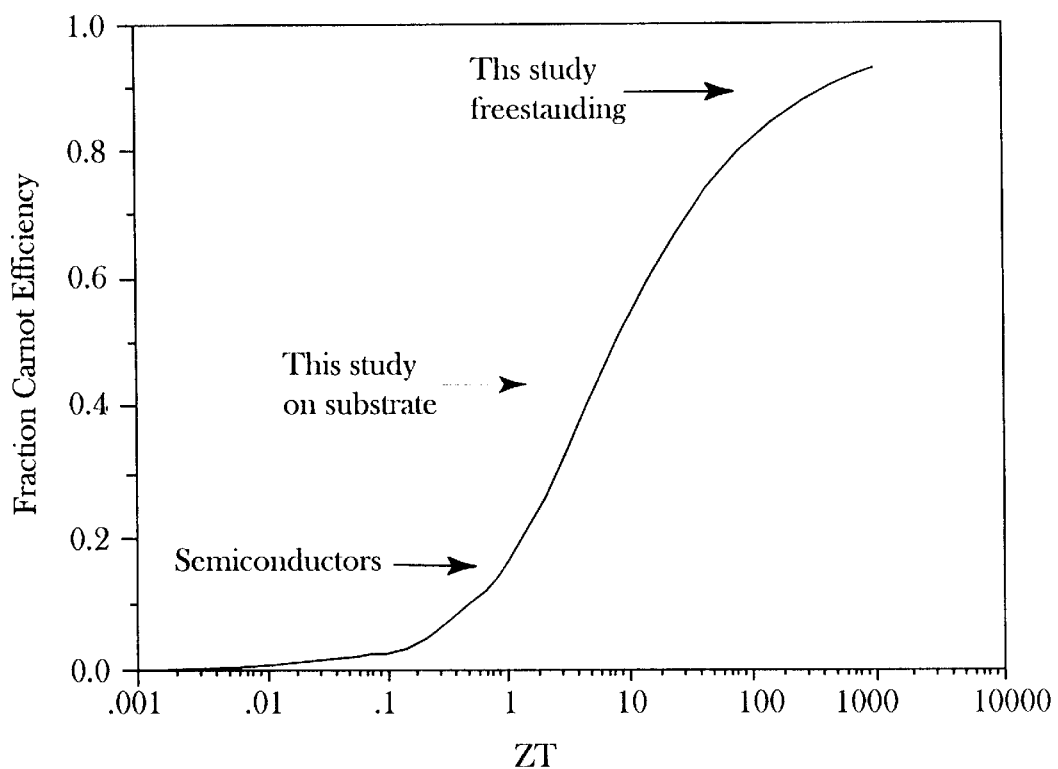
FIG. 9 is a plot of fraction of ideal Carnot efficiency as a function of the thermoelectric material figure-of-merit calculated as is known (King A. L. in Encyclopedia of Physics, Besancon R. (Editor), p 804, 1974).

The fraction Carnot efficiency values in FIG. 9 predict three to five times more efficient thermoelectric coolers than prior art devices when based on the class of materials of this invention and using the method of making the composite material of this invention as taught herein.

The effective addition of nanophase metal particles to electroactive polymers offers a novel and unique way to increase the ZT of composites. These nanophase metals (such as Ag, Au, Pt, Pd, Cu, Cr, Ta, Sb, Fe, Sn) are in the form of powders with particle sizes of 5 nanometers to 100 nanometers and sintered aggregations of these particles, or mixtures thereof. These aggregations are varying-length "strings" of the nano-particles in which the nanophase particles of metal are fused tightly and connected by narrowed sections of the same metal. By "aggregations" we mean formed by the collection of units or particles into a body.

Nanophase metal particles can be well dispersed into the polymer RPOT in liquid state or solution by mechanical means, and, by imputation, into other similar molecular structures. Given that the optimum thermoelectric properties were found to occur between 3 and 4 volume percent concentration of nano-Ag, well below the critical volume percent (percolation limit) found to form an electrical shunt, we believe almost all the electric current is carried by a different mechanism than a shunting conductor path which is the mechanism exhibited by the micro- and nano- particles of the prior art.

The composition of matter obtained by effective mixing of nanophase metal particles into conducting polymers is useful in thermoelectric cooling (and heating) devices. As indicated above, devices of this type are well known. One such device 10 is shown in FIG. 8. A layer 2 of the thermoelectric material of the invention is bonded to a metallic substrate 4 of high thermal conductivity such as copper. Optionally, an extremely thin layer 6 of diamond, or diamond-like material, occupies the interface between substrate 4 and the thermoelectric layer 2 to act as a high thermal conductivity bonding layer. This can be provided by chemical vapor deposition and serves to improve bonding without interference with thermal transfer. Substrate 4 serves as a heat sink and mounting surface. The upper surface of thermoelectric layer 2 contacts another substrate 8 which optionally may have a diamond layer 6 for high thermal conductivity bonding. The substrates 4 and 8 provide respectively, the elevated and the reduced temperature source for whatever other objects (components or the like) are in association with that surface. Electrical contacts, schematically shown as 12, are made to opposite surfaces of layer 2. The substrates may be used as electrodes as well for convenience provided that the layer 2 is not insulated. As diamond is an electrical insulator, when diamond layers are present, a conductive bonding agent is needed. We have found that these contacts 2 (electrodes) are best inserted when layer 2 is in a semi-solid condition.

The results presented indicate that we have invented a new composition of matter comprising a dispersion of nanophase metal particles in a conducting polymer matrix. Thus, by implication to one of skill in the art, the present invention includes a dispersion of nanophase metal particles in a matrix selected from the group comprising crystalline polymers, amorphous polymers, metals and dielectrics, said particles being intimately associated with the monomeric units of said polymers or intimately associated with the grains of said metals or the crystallites of said dielectrics.

Other modifications of the above described embodiments of the invention which are obvious to those of skill in the areas of solid state physics and thermoelectric materials and devices and discipline are intended to be within the scope of the following.

What is claimed is:

1. A conductive composition of matter comprising a dispersion of nanophase metal particles in an intrinsically conducting polymer.

2. The composition of matter of claim 1 wherein said polymer is a conjugated polymer.

3. The composition of matter of claim 1 wherein the thermoelectric figure-of-merit is greater than 1.0.

4. A thermoelectric cooling and/or heating medium comprising:
   i) a dispersion of nanophase metal particles in an intrinsically conducting polymer
   ii) said conductive polymer characterized by a high inherent Seebeck coefficient and a low inherent thermal conductivity; and
   iii) an effective amount of said nanophase metal particles effectively dispersed into and intimately associated with said polymer to establish a nanophase-metal/polymer, thermoelectric composite material;
whereby the electrical conductivity of said nanophase metal/polymer composite material is substantially increased without significant change in either said thermal conductivity or Seebeck coefficient.

5. The composite material of claim 4 wherein said polymer is a conjugated polymer.

6. The composite material of claim 4 wherein the thermoelectric figure-of-merit is greater than 1.0.

7. The composite material of claim 4 wherein said polymer is selected from the group consisting of polythiophene, polyaniline, polypyrrole, polyacetylene, their substituted derivatives and similar polymers.

8. The composite material of claim 7 wherein said polymer is poly(3-octylthiophene-2,5-diyl).

9. The composite material of claim 8 wherein said polymer is regio-regular poly(3-octylthiophene-2,5-diyl).

10. The composite material of claim 4 wherein said nanophase metal particles are selected from the group consisting of silver, copper, platinum, palladium, aluminum, chromium, iron, antimony, tin, tantalum, gold, similar metals and mixtures thereof.

11. The composite material of claim 4 wherein said nanophase metal particles comprise nanophase silver particles made by the inert-gas-condensation process.

12. The composite material of claim 4 wherein said effective amount of said metal particles has a concentration of about 0.1 volume percent to about 34 volume percent.

13. The composite material of claim 4 wherein said effective amount of said metal particles has a concentration of about 0.1 volume percent to about 10 volume percent.

14. A composition of matter comprising a dispersion of nanophase metal particles in a matrix selected from the group comprising crystalline polymers, amorphous polymers, metals and dielectrics, said particles being intimately associated with the monomeric units of said polymers or intimately associated with the grains of said metals or the crystallites of said dielectrics.

15. The composite material of claim 14 wherein said polymer is a conducting polymer.

16. The composite material of claim 14 wherein said polymer is a conjugated polymer.

17. The composite material of claim 14 wherein the thermoelectric figure-of-merit is greater than 1.0.

18. A method of making a composition of matter characterized by a thermoelectric figure-of-merit (ZT) greater than 1.0 comprising effective mixing of nanophase metal particles into a polymeric matrix characterized by a Seebeck coefficient greater than 100.

19. The method of claim 18 wherein said effective mixing is carried out while said polymeric matrix is dissolved by a solvent into a solution and said solvent is removed to form said composition of matter.

20. The method of claim 18 further comprising providing as said polymeric matrix a polymer selected from the group consisting of polythiophene, polyaniline, polypyrrole, polyacetylene, their substituted derivatives and similar polymers, dissolving said polymer in an effective solvent producing a solution and effectively mixing therein said solution an effective amount of a nanophase metal powder selected from the group consisting of silver, copper, platinum, palladium, aluminum, tantalum, chromium, iron, antimony, tin, gold,similar metals, and mixtures thereof and removing said solvent to form said composition of matter.

21. The method of claim 20 wherein said composition of matter is formed on a solid surface.

22. The method of claim 21 further comprising stopping said solvent removal when a spreadable viscous mass has formed, spreading said mass in a layer on said surface and resuming said removal to form a dry layer of said composition of matter on said surface.

23. The method of claim 22 further comprising providing a plurality of said dry layers on a plurality of said surfaces, removing said dry layers from said surfaces, stacking a selected number of said removed layers to a selected thickness, heating said thickness to the melting temperature of said polymer, mixing, and annealing to form a solid article of manufacture of said composition of matter.

24. A thermoelectric device comprising:
   i) at least one thermally conductive substrate;
   ii) a layer of selected thickness of the thermoelectric composite material of claim 4, at least one side of said layer being in heat transfer contact with said at least one substrate.

25. The device of claim 24 wherein the thermoelectric figure-of-merit (ZT) is greater than 1.0.

26. The device of claim 24 wherein said polymer is selected from the group consisting of: polythiophene, polyaniline, polypyrrole, polyacetylene and their substituted derivatives.

27. The device of claim 24 wherein said nanophase metal particles are selected from the group consisting of silver, copper, platinum, palladium, aluminum, tantalum, chromium, iron, antimony, tin, gold, similar metals and mixtures thereof.

28. The device of claim 24 wherein said effective amount of said metal particles has a concentration of about 0.1 volume percent to about 34 volume percent.

29. The device of claim 24 wherein said effective amount of said metal powder has a concentration of about 0.1 volume percent to about 10 volume percent.

30. The device of claim 24 wherein said at least one thermally conductive substrate is metal.

31. The device of claim 30 wherein said thermally conductive metal substrate is copper.

32. The device of claim 30 wherein said at least one substrate is coated with diamond or diamond-like material.

33. The device of claim 24 wherein said thermoelectric composite material layer is in contact with substrates on opposing sides thereof.

34. The device of claim 33 wherein said substrates are coated with diamond or diamond-like material.

35. The device of claim 24 wherein said polymer in said composite material comprises poly(3-octylthiophene-2,5 diyl) and said nanophase metal particles comprise nanophase silver particles made by the inert-gas-condensation process.

36. The device of claim 35 wherein said polymer comprises a regio-regular poly(3-octylthiophene-2,5 diyl).

37. The device of claim 24 wherein electrodes are inserted into said thermoelectric composite material on opposing sides thereof while said material is in a non-solid state.

* * * * *